Feb. 22, 1927.  G. A. SMITH ET AL  1,618,681

SAFETY SIGNAL

Filed Dec. 15, 1923

Guy A. Smith   Inventors
AND Edgar L. Evans

By *[signature]*

Their Attorney

Patented Feb. 22, 1927.

1,618,681

UNITED STATES PATENT OFFICE.

GUY A. SMITH AND EDGAR L. EVANS, OF KANSAS CITY, KANSAS.

SAFETY SIGNAL.

Application filed December 15, 1923. Serial No. 681,016.

This invention relates to safety signals, and particularly to signals designed to give warning to approaching vehicles carrying head-lights.

The primary object of this invention is to provide a device that will indicate to the approaching motorist the presence of a dangerous or hazardous situation which requires his attention.

A further object of the invention is the provision of an indicator that is particularly adapted to be affixed to the front or rear of an automobile, to warn passing motorists of its presence, especially when it is parked or the lights not burning.

A still further object of the invention is to provide a safety signal for attachment to automobiles or the like which will not require attention, will always function, and necessitates no expense of upkeep above the initial cost.

An even further object of this invention is the provision of a safety signal that will never get out of order, will not rust, corrode or deteriorate, and will operate anywhere without expense or consumption of energy.

With the foregoing general objects in view, the invention will now be described by reference to the accompanying drawings illustrating one form of construction which we have devised for embodying the inventon, after which the various novel features therein will be particularly set forth and claimed.

Figure 1:
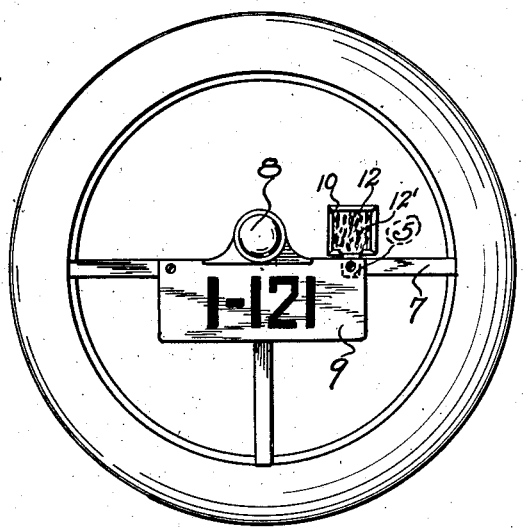
Figure 1 shows the safety signal in use on the rear end of an automobile.
Figure 2:
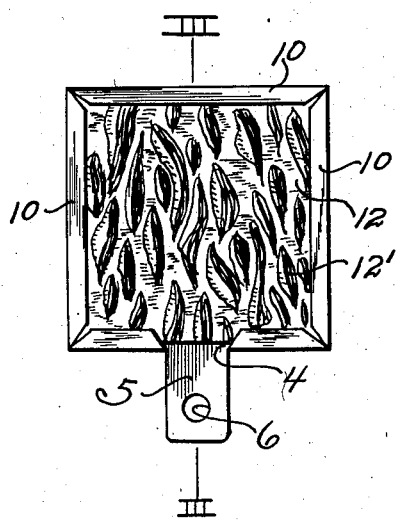
Fig. 2 is an enlarged face view of the indicator.
Figure 3:
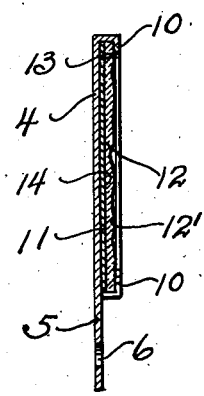
Fig. 3 is a sectional view taken on line III—III of Fig. 2.
Figure 4:
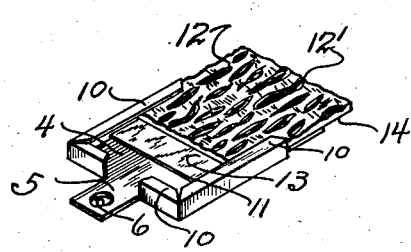
Fig. 4 is a perspective view of the device partly assembled and showing the relation of parts.

Referring to the drawing in detail, a supporting case 4, preferably formed of a non-rusting sheet metal, may have an integral lug 5 with an aperture 6 therein for attaching the indicator to any part of an automobile.

This lug 5 may be bent at any angle to accommodate the particular angle at point of attachment, and is adapted for horizontal as well as perpendicular fastening. For purpose of illustration, it is here shown affixed to the horizontal bar 7 of a spare tire rack, and located near tail-light 8 and license plate 9 on the rear of an automobile. Flanges 10 formed to grip reflector 11 and glass 12 insure compactness and perfect contact between the reflecting surface 13 and smooth back 14 of glass 12.

Reflector 11 is preferably made of polished sheet aluminum, but the same result may be attained by highly polishing the inner side of supporting case 4 or, by silvering the smooth back 14 of glass 12. Any sheet metal may be used in this construction, but by using aluminum for the reflector 11 and brass for the supporting case 4, it is evident that troubles from rusting are entirely eliminated.

Glass 12, which is colored red to give the desired effect, is translucent and has a smooth back 14. On its front face a series of undulated ripples or waves 12' causes the thickness to vary and the angle of refraction to differ at practically every point on the glass 12. As a result of this peculiar construction, the rays of light projected from any source of illumination are refracted by and pass through the red glass 12 to surface 13 of reflector 11 and immediately are reflected, and again refracted, and sent back.

The ripples or waves 12' on the face of red glass 12 break up the reflected rays of light to the extent of causing a splotchy, bright, flashy-red light to be projected toward the driver of an approaching light-carrying vehicle. This warning light of bright red will always attract the driver's attention and, in fact, perform the duty of a constantly burning tail or parking light.

After extensive experimentation it has been found that glass, having the above-mentioned characteristics, is the only kind that will perform the desired function. The present assembly has also proven highly desirable and successful. The device may be made any size and placed at any dangerous point where a warning signal is necessary.

It will thus be seen that we have devised a very simple, compact and efficient arrangement and construction for fulfilling the desired objects of the invention, and while we have illustrated what now seems to constitute the preferred form of construction, we desire to secure and reserve the right to make such changes or modifications as may fairly fall within the scope of the following claims:

1. In a safety signal having a sheet of colored translucent material provided with a series of undulated ripples on its face and a reflector in contact with the back thereof, means for binding and supporting said translucent material and reflector in operative position comprising a supporting member formed from sheet metal having a solid back with a clasping flange provided at its periphery, said flange being cut away and disposed in a plane with said back to form an attaching lug for said safety signal.

2. In a safety signal having a sheet of colored translucent material provided with a series of undulated ripples on its face and a reflector in contact with the back thereof, means for binding and supporting said translucent material and reflector in operative position comprising a supporting member formed from a single piece of sheet metal having a solid back with clasping flanges provided at its edges, said flanges being slit transversely at spaced points centrally of one edge, the flange between said slits being disposed in the plane with said back and perforated to form an attaching lug for said safety signal.

3. In a safety signal having a sheet of colored translucent material provided with a series of undulated ripples on its face and a reflector in contact with the back thereof, means for binding and supporting said translucent material and reflector in operative position comprising a supporting member formed from a single piece of sheet metal having a solid back with clasping flanges provided at its edges, said flange being slit transversely at spaced points centrally of one edge, the flange between said slits being rebent and disposed in the same plane as said back and perforated to form an attaching lug for said safety signal, whereby the said signal may be tilted to any angle for properly positioning the reflecting surface in the path of light.

In testimony whereof we hereunto affix our signatures.

GUY A. SMITH.
EDGAR L. EVANS.